United States Patent
Masuhara et al.

(10) Patent No.: US 9,657,127 B2
(45) Date of Patent: May 23, 2017

(54) COMPOSITION FOR SOFT MATERIALS, AND SOFT MATERIAL

(71) Applicant: SUMITOMO SEIKA CHEMICALS CO., LTD., Hyogo (JP)

(72) Inventors: Yusaku Masuhara, Hyogo (JP); Naoyuki Hashimoto, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 14/761,517

(22) PCT Filed: Dec. 4, 2013

(86) PCT No.: PCT/JP2013/082572
§ 371 (c)(1),
(2) Date: Jul. 16, 2015

(87) PCT Pub. No.: WO2014/112234
PCT Pub. Date: Jul. 24, 2014

(65) Prior Publication Data
US 2015/0361209 A1    Dec. 17, 2015

(30) Foreign Application Priority Data

Jan. 21, 2013  (JP) ................................. 2013-008506

(51) Int. Cl.
| | |
|---|---|
| *C08F 290/10* | (2006.01) |
| *C08F 283/00* | (2006.01) |
| *C08B 37/16* | (2006.01) |
| *C08L 5/16* | (2006.01) |

(52) U.S. Cl.
CPC ........ *C08F 290/10* (2013.01); *C08B 37/0015* (2013.01); *C08F 283/006* (2013.01); *C08L 5/16* (2013.01)

(58) Field of Classification Search
CPC ............... C08F 283/006; C08F 290/10; C08B 37/0015; C08L 5/16
See application file for complete search history.

(56) References Cited

U.S. PATENT DOCUMENTS

| | | | |
|---|---|---|---|
| 2008/0097039 A1 | 4/2008 | Ito et al. | |
| 2009/0047532 A1 | 2/2009 | Ito et al. | |
| 2009/0062467 A1 | 3/2009 | Arai et al. | |
| 2009/0214871 A1* | 8/2009 | Fukuda ................... | C09D 4/00 428/413 |
| 2009/0215919 A1 | 8/2009 | Ito et al. | |
| 2011/0105688 A1* | 5/2011 | Ruslim ............... | C08B 37/0015 525/54.26 |
| 2011/0118376 A1 | 5/2011 | Hayashi et al. | |
| 2011/0256393 A1 | 10/2011 | Arai et al. | |
| 2011/0319527 A1 | 12/2011 | Suzuki et al. | |
| 2012/0316278 A1 | 12/2012 | Inoue et al. | |
| 2014/0066403 A1 | 3/2014 | Yamasaki et al. | |

FOREIGN PATENT DOCUMENTS

| | | |
|---|---|---|
| CN | 101278020 | 10/2008 |
| CN | 101287775 | 10/2008 |
| CN | 101405361 | 4/2009 |
| CN | 102245728 | 11/2011 |
| CN | 102317384 | 1/2012 |
| EP | 1 734 066 A1 | 12/2006 |
| EP | 1 900 776 A1 | 3/2008 |
| EP | 2 174 960 A1 | 4/2010 |
| JP | 2009-120759 | 6/2009 |
| JP | 2009-204832 | 9/2009 |
| JP | 2010-138258 | 6/2010 |
| JP | 2011-046917 | 3/2011 |
| JP | 2011-241401 | 12/2011 |
| JP | 2012-144591 | 8/2012 |
| KR | 10-1295325 | 8/2013 |
| WO | 2006/088200 | 8/2006 |
| WO | 2009/145073 | 12/2009 |
| WO | 2012/124220 | 9/2012 |
| WO | 2012/165401 A1 | 12/2012 |

OTHER PUBLICATIONS

International Search Report, Jan. 7, 2014; PCT/JP2013/082572 (2 pages).
Chang Guan Jun, "Viscoelastic Damping Materials (Chinese Edition)", published by guo fang gong ye chu ban she, Dec. 2012, pp. 193-194.

* cited by examiner

*Primary Examiner* — Robert Jones, Jr.
(74) *Attorney, Agent, or Firm* — Hamre, Schumann, Mueller & Larson, P.C.

(57) ABSTRACT

The present invention aims to provide a composition for soft materials, which enables production of a soft material excellent in transparency, a stress relaxation property, and strength and having an elongation property that is not so much lowered even at high temperatures. The present invention also aims to provide a soft material produced using the composition for soft materials of the present invention. The present invention relates to a composition for soft materials including polyrotaxane and a radical polymerizable monomer, the polyrotaxane including a cyclic molecule, a linear molecule threading through a cavity of the cyclic molecule in a skewered manner, and capping groups that cap both ends of the linear molecule, the polyrotaxane having at least one cyclic molecule with a radical polymerizable group, the polyrotaxane having at least two radical polymerizable groups.

3 Claims, 1 Drawing Sheet

(a)
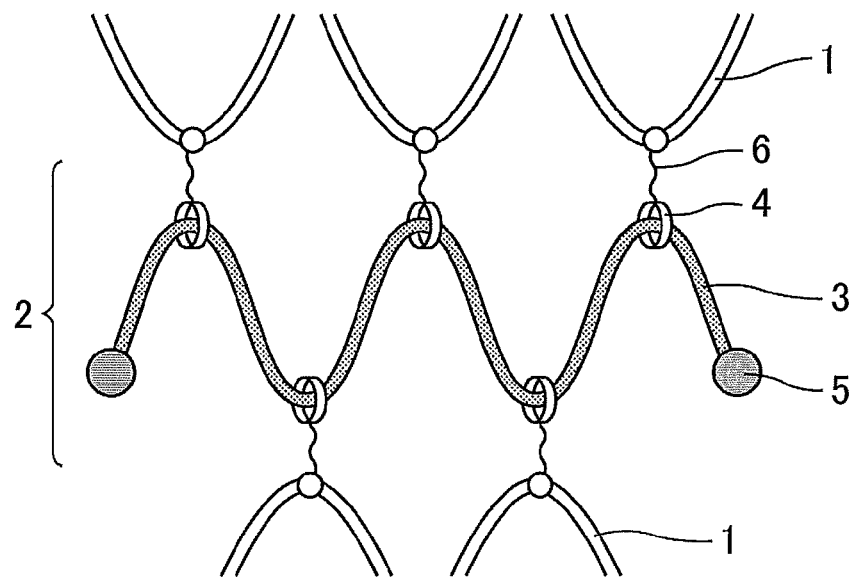
(b)
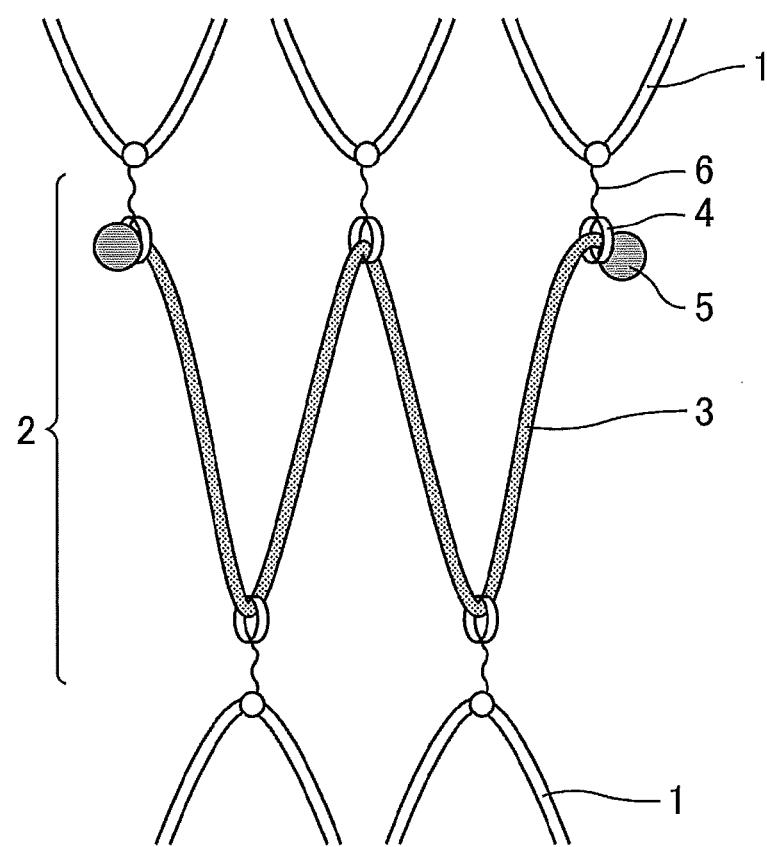

COMPOSITION FOR SOFT MATERIALS, AND SOFT MATERIAL

TECHNICAL FIELD

The present invention relates to a composition for soft materials containing polyrotaxane. The present invention also relates to a soft material produced using the composition for soft materials.

BACKGROUND ART

Polyrotaxane including a cyclic molecule, a linear molecule threading through a cavity of the cyclic molecule in a skewered manner, and capping groups that cap both ends of the linear molecule has specific viscoelastic characteristics and the like, and therefore is expected to be used in various fields. For reflecting the specific viscoelastic characteristics of polyrotaxane to a material, the use of polyrotaxane as a crosslinking agent is considered.

As a material containing polyrotaxane as a crosslinking agent, Patent Literature 1 discloses a urethane elastomer having a low permanent strain, a low stress relaxation property, and a low hysteresis loss.

Patent Literature 2 discloses an adhesive having both a high stress relaxation property and a high holding force due to crosslinkage between a (meth)acrylic ester copolymer having a hydroxy group and polyrotaxane. In the crosslinkage, hydroxy groups in polyrotaxane and in a (meth)acrylate copolymer are used as reaction points. Commonly, hydroxy groups hardly react with each other directly, and therefore are chemically bonded to each other through a polyfunctional isocyanate.

CITATION LIST

Patent Literature

Patent Literature 1: JP-A 2011-241401
Patent Literature 2: JP-A 2010-138258

SUMMARY OF INVENTION

Technical Problem

The urethane elastomer disclosed in Patent Literature 1 is a urethane material, and therefore is likely to be colored and inappropriate for applications that require visible light transparency. Moreover, the urethane elastomer disadvantageously has a low stress relaxation property.

The adhesive disclosed in Patent Literature 2 has both a high stress relaxation property and a high holding force but may be insufficient in strength. Moreover, since a polyfunctional isocyanate is used, problems arise concerning the safety during the production and difficulty in using a component reactive with isocyanate.

The present invention aims to provide a composition for soft materials, which enables production of a soft material excellent in transparency, a stress relaxation property, and strength and having an elongation property that is not so much lowered even at high temperatures. The present invention also aims to provide a soft material produced using the composition for soft materials.

Solution to Problem

The present invention relates to a composition for soft materials containing polyrotaxane and a radical polymerizable monomer, the polyrotaxane including a cyclic molecule, a linear molecule threading through a cavity of the cyclic molecule in a skewered manner, and capping groups that cap both ends of the linear molecule, the polyrotaxane having at least one cyclic molecule with a radical polymerizable group, the polyrotaxane having at least two radical polymerizable groups.

The present invention is specifically described in the following.

The present inventors found out that a soft material excellent in transparency, a stress relaxation property, and strength and having an elongation property that is not so much lowered even at high temperatures can be obtained by introducing a radical polymerizable group to a cyclic molecule of polyrotaxane and using the polyrotaxane as a crosslinking agent for a radical polymerizable monomer, thereby completing the present invention.

A description is given on the reason why a soft material produced using the composition for soft materials of the present invention is excellent in the stress relaxation property and strength with reference to drawings.

FIG. 1 are schematic diagrams illustrating exemplary structures of a soft material produced using the composition for soft materials of the present invention. As illustrated in FIG. 1(a), in a soft material, polymer segments 1 derived from a radical polymerizable monomer are crosslinked by a segment 2 derived from polyrotaxane. In the segment 2 derived from polyrotaxane, a linear molecule 3 is threading through cavities of cyclic molecules 4 in a skewered manner to be included therein, and both ends of the linear molecule 3 are capped with capping groups 5. Radical polymerizable groups in a polymer derived from the radical polymerizable monomer react with radical polymerizable groups in polyrotaxane to form crosslinking points 6, so that the polymer derived from the radical polymerizable monomer is crosslinked. In the composition for soft materials of the present invention, polyrotaxane to be reacted with a polymer derived from the radical polymerizable monomer has radical polymerizable groups in the cyclic molecules 4. Accordingly, the crosslinking points 6 are formed on the cyclic molecules 4 and can freely move along the linear molecule 3 together with the cyclic molecules 4.

As illustrated in FIG. 1(b), when the soft material produced using the composition for soft materials of the present invention is elongated, the crosslinking points 6 move along the linear molecule 3. In this manner, the stress is not concentrated but distributed.

As described above, a soft material produced using the composition for soft materials of the present invention can distribute a stress by movement of crosslinking points under application of a force from the outside. Such a soft material is more excellent in the stress relaxation property and strength compared to a soft material produced using a conventional crosslinking agent that provides immobilized crosslinking points. Moreover, such a soft material is formed by crosslinking a polymer derived from a radical polymerizable monomer, and therefore is excellent in transparency. In common polymeric materials, the elongation at break tends to be lowered at high temperatures. In the case of a soft material produced using the composition for soft materials of the present invention, however, the elongation at break is not so much lowered or rather increased at high temperatures.

The composition for soft materials of the present invention contains polyrotaxane including a cyclic molecule, a linear molecule threading through a cavity of the cyclic molecule in a skewered manner, and capping groups capping both ends of the linear molecule.

The cyclic molecule is not particularly limited, as long as it can include a linear molecule threading through a cavity thereof in a skewered manner and is movable along the linear molecule. As a method for including the linear molecule in the cyclic molecule, a conventionally known method (e.g., method disclosed in JP-A 2005-154675) may be employed.

The word "cyclic" of the cyclic molecule as used herein refers to a state of a molecule being substantially cyclic. As long as the molecule can move along the linear molecule, the cyclic molecule does not need to have a closed cyclic structure and may have, for example, a helical structure.

Examples of the cyclic molecule include cyclic polymers such as cyclic polyether, cyclic polyester, and cyclic polyether amine, and cyclodextrin.

Examples of the cyclic polymers include crown ethers and derivatives thereof, calixarenes and derivatives thereof, cyclophanes and derivatives thereof, and cryptands and derivatives thereof.

The cyclic molecule is appropriately selected in accordance with the kind of the linear molecule to be used. Preferred are cyclodextrins such as α-cyclodextrin, β-cyclodextrin, and γ-cyclodextrin because they are easily available and the kind of the capping groups can be selected from many. For example, as described later, when polyethylene glycol is selected as the linear molecule, preferred is α-cyclodextrin in terms of the stability of an obtainable inclusion complex.

When cyclodextrin is used as the cyclic molecule, a part of hydroxy groups of the cyclodextrin may be substituted with a substituent capable of imparting the solubility of polyrotaxane to the radical polymerizable monomer. Examples of the substituent capable of imparting the solubility include an acetyl group, a C1-C18 alkyl group, a trityl group, a trimethylsilyl group, a phenyl group, a polyester chain, an oxyethylene chain, and a polyacrylic ester chain. Each of these substituents may be introduced alone, or two or more of these may be introduced. When two or more substituents are introduced, for example, when an oxyethylene chain and a polyester chain are introduced, a hydroxy group of cyclodextrin is first substituted with an oxyethylene chain, and a polyester chain is introduced from a hydroxy group at an end of the introduced oxyethylene chain. Further, a polycaprolactone (polyester) chain can be introduced by adding a hydroxypropyl group to a hydroxy group present in cyclodextrin and then conducting ring-opening polymerization of ε-caprolactone through a hydroxy group of the hydroxypropyl group.

From the standpoint of enhancing the solubility of polyrotaxane in the radical polymerizable monomer, the introduction rate (substitution degree) of the substituents is preferably 10 to 90% and more preferably 30 to 70% relative to the hydroxy groups of cyclodextrin.

The polyrotaxane in the composition for soft materials of the present invention contains at least one cyclic molecule having a radical polymerizable group, and has at least two radical polymerizable groups. In terms of the stress dispersibility of an obtainable soft material, the polyrotaxane preferably has at least two cyclic molecules each having a radical polymerizable group.

The radical polymerizable group may be directly introduced to a reaction point of the cyclic molecule, for example, a hydroxy group of cyclodextrin. Alternatively, the radical polymerizable group may be introduced to a terminal reaction point of a substituent capable of imparting the solubility, for example, a hydroxy group at an end of a polycaprolactone chain formed by adding a hydroxypropyl group to a hydroxy group of cyclodextrin and then conducting ring-opening polymerization of ε-caprolactone through the hydroxy group of the hydroxypropyl group for introduction of a polycaprolactone (polyester) chain.

The introduction rate of the radical polymerizable groups into the polyrotaxane is preferably 1% at the minimum. When the introduction rate of the radical polymerizable groups is 1% or more, an obtainable soft material has excellent strength. The introduction rate of the radical polymerizable groups is more preferably 5% at the minimum and still more preferably 10% at the minimum. The introduction rate of the radical polymerizable groups is preferably 90% at the maximum and more preferably 80% at the maximum.

An explanation is given on how to calculate the introduction rate of the radical polymerizable groups in a case where the cyclic molecule is cyclodextrin. (Case where a radical polymerizable group is directly introduced into a hydroxy group of cyclodextrin or case where the substituent preliminary introduced into cyclodextrin for imparting the solubility has a hydroxy group)

In conformity with "JIS K 0070", the amount of substance A1 (mol) of hydroxy groups per mole of polyrotaxane before introduction of radical polymerizable groups is obtained based on the hydroxy value of the polyrotaxane before introduction of radical polymerizable groups. Similarly, the amount of substance A2 (mol) of hydroxy groups per mole of the polyrotaxane after introduction of radical polymerizable groups is obtained based on the hydroxy value of the polyrotaxane after introduction of radical polymerizable groups. Using these obtained values, the introduction rate can be calculated from the following equation:

$$\text{Introduction rate (\%) of radical polymerizable groups} = \{(A1-A2)/A1\} \times 100.$$

(Case where the Substituent Preliminary Introduced into Cyclodextrin for Imparting the Solubility has No Hydroxy Group)

In conformity with "JIS K 0070", the amount of substance A3 (mol) of hydroxy groups per mole of polyrotaxane before introduction of solubility-imparting groups is obtained based on the hydroxy value of the polyrotaxane before introduction of solubility-imparting groups. Similarly, the amount of substance A4 (mol) of hydroxy groups per mole of polyrotaxane after introduction of solubility-imparting groups is obtained based on the hydroxy value of the polyrotaxane after introduction of solubility-imparting groups. The amount of substance A5 (mol) of hydroxy groups per mole of polyrotaxane after introduction of radical polymerizable groups is obtained based on the hydroxy value of the polyrotaxane after introduction of radical polymerizable groups. Using these obtained values, the introduction rate can be calculated from the following equation:

$$\text{Introduction rate (\%) of radical polymerizable group} = \{(A4-A5)/A3\} \times 100.$$

When the reaction point from which a substituent is introduced is not a hydroxy group such as the case where the cyclic molecule is not cyclodextrin, the amount of substance of reactive groups per mole of polyrotaxane is obtained by a method of measuring the number of the reaction points (reactive groups), instead of the method in conformity with "JIS K 0070". Using the obtained values, the introduction rate of radical polymerizable groups can be calculated in the same manner as in the above calculation method.

Examples of the radical polymerizable groups of the cyclic molecule include a (meth)acryloyl group, a vinyl group, and a maleimide group. The radical polymerizable groups include preferably at least one selected from the group consisting of a (meth)acryloyl group and a vinyl group, and more preferably a (meth)acryloyl group in terms of the excellent radical polymerizability.

The term "(meth)acryloyl group" as used herein refers to an "acryloyl group" and a "methacryloyl group".

The radical polymerizable groups can be introduced by reacting a reactive group, such as a hydroxy group of a cyclic molecule before introduction of the radical polymerizable groups, with a compound having a functional group reactive with the reactive group and a radical polymerizable group.

Examples of the compound having a radical polymerizable group and a functional group reactive with the reactive group include, when a (meth)acryloyl group is introduced as a radical polymerizable group, (meth)acryloyl chloride, (meth)acrylic acid anhydride, 2-(meth)acryloyloxyethyl isocyanate, 2-hydroxyethyl(meth)acrylate, glycidyl(meth)acrylate, α-methacryloyloxy-γ-butyrolactone, and β-methacryloyloxy-γ-butyrolactone.

When a vinyl group is introduced as a radical polymerizable group, the examples include p-vinylbenzoic acid, p-t-butyl styrene, 3-isopropenyl-α,α-dimethyl benzyl isocyanate, and vinyl chloroacetate.

When a maleimide group is introduced as a radical polymerizable group, the examples include 3-maleimidopropionic acid, N-succinimidyl 3-maleimidopropionate, N-succinimidyl 4-maleimidobutyrate, and N-succinimidyl 6-maleimidohexanoate.

In terms of availability and easiness of the reaction, preferred are (meth)acryloyl chloride, 2-(meth)acryloyloxy ethyl isocyanate, glycidyl(meth)acrylate, 3-isopropenyl-α,α-dimethyl benzyl isocyanate, and vinyl chloroacetate.

The inclusion rate refers to a ratio (in percentage) of the actual inclusion amount of the cyclic molecule relative to the maximum inclusion amount of the cyclic molecule when the linear molecule is included in the cyclic molecule. The inclusion rate is preferably 0.1% at the minimum and 60% at the maximum, more preferably 1% at the minimum and 50% at the maximum, and still more preferably 5% at the minimum and 40% at the maximum.

The maximum inclusion amount can be determined based on the length of the linear molecule and the thickness of the cyclic molecule. For example, the maximum inclusion amount in the case where the linear molecule is polyethylene glycol and the cyclic molecule is α-cyclodextrin has been experimentally calculated (see Macromolecules 1993, 26, 5698-5703).

The linear molecule is not particularly limited as long as it can be included in the cavity of a cyclic molecule in a skewered manner. Examples thereof include polyvinyl alcohol, polyvinyl pyrrolidone, poly(meth)acrylic acid, cellulose resins (e.g., carboxymethylcellulose, hydroxyethylcellulose, hydroxypropylcellulose), polyacrylamide, polyethylene oxide, polyethylene glycol, polypropylene glycol, polyvinyl acetal resins, polyvinyl methyl ether, polyamine, polyethyleneimine, casein, gelatin, starch, and/or copolymers of these, polyolefin resins such as polyethylene, polypropylene, and copolymer resins with other olefinic monomers, polyester resins, polyvinyl chloride resins, polystyrene resins such as polystyrene and acrylonitrile-styrene copolymers, acrylic resins such as polymethyl methacrylate, (meth)acrylate copolymers, and acrylonitrile-methyl acrylate copolymer resin, polycarbonate resins, polyurethane resins, vinyl chloride-vinyl acetate copolymer resin, polyvinylbutyral resin, and derivatives or modified products thereof, polyisobutylene, polytetrahydrofuran, polyaniline, acrylonitrile-butadiene-styrene copolymers (ABS resin), polyamides such as nylon, polyimides, polydienes such as polyisoprene and polybutadiene, polysiloxanes such as polydimethylsiloxane, polysulfones, polyimines, polyacetic anhydrides, polyureas, polysulfides, polyphosphazenes, polyketones, polyphenylenes, polyhaloolefins, and derivatives thereof. Preferred among these are polyethylene glycol, polyisoprene, polyisobutylene, polybutadiene, polypropylene glycol, polytetrahydrofuran, polydimethyl siloxane, polyethylene, polypropylene, polyvinyl alcohol, and polyvinyl methyl ether. More preferred are polyethylene glycol, polypropylene glycol, polytetrahydrofuran, polydimethyl siloxane, polyethylene, and polypropylene. Still more preferred is polyethylene glycol.

The term "(meth)acryl" as used herein refers to "acryl" and "methacryl".

The linear molecule has a mass average molecular weight of preferably 3000 at the minimum and 300000 at the maximum. When the linear molecule has a mass average molecular weight of 3000 or more, the cyclic molecule can be more movable along the linear molecule, so that an obtainable soft material has an excellent stress relaxation property. When the linear molecule has a mass average molecular weight of 300000 or less, polyrotaxane has enough solubility in a radical polymerizable monomer. The linear molecule has a mass average molecular weight of more preferably 5000 at the minimum and 100000 at the maximum, and still more preferably 10000 at the minimum and 50000 at the maximum.

The mass average molecular weight used herein is a polyethylene glycol equivalent value calculated based on the measurement by gel permeation chromatography (GPC). A column used for determination of the polyethylene glycol equivalent mass average molecular weight by GPC is, for example, TSKgel SuperAWM-H (produced by TOSOH CORPORATION).

The mass average molecular weight of a molecule other than the linear molecule is, unless otherwise specified, a polystyrene equivalent value calculated based on the measurement by GPC. A column used for determination of the polystyrene equivalent mass average molecular weight by GPC is, for example, TSKgel SuperHM-M (produced by TOSOH CORPORATION).

Polyrotaxane used for the composition for soft materials of the present invention preferably includes polyethylene glycol as the linear molecule and a molecule derived from α-cyclodextrin as the cyclic molecule.

The capping groups are placed at both ends of the linear molecule included in the cyclic molecule to prevent separation of the cyclic molecule. The method for capping both ends of the linear molecule with capping groups may be a conventionally known method (e.g., method disclosed in JP-A 2005-154675).

Examples of the capping groups include dinitrophenyl groups, cyclodextrins, adamantane groups, trityl groups, fluoresceins, silsesquioxanes, pyrenes, anthracenes, and main chains or side chains of polymers having a mass average molecular weight of 1000 to 1000000.

Preferred among these are dinitrophenyl groups, cyclodextrins, adamantane groups, trityl groups, fluoresceins, silsesquioxanes, and pyrenes, and more preferred are adamantane groups and trityl groups.

Examples of the polymers having a mass average molecular weight of 1000 to 1000000 include polyamide, polyimide, polyurethane, polydimethyl siloxane, and polyacrylic esters.

Two or more kinds of the capping groups may be present in polyrotaxane.

The amount of the polyrotaxane in the composition for soft materials of the present invention is preferably 0.2% by mass at the minimum and 30% by mass at the maximum. When the amount of the polyrotaxane is 0.2% by mass or more, an obtainable soft material is excellent in the strength. When the amount of the polyrotaxane is 30% by mass or less, an obtainable soft material is excellent in the flexibility and elongation at break. The amount of the polyrotaxane in the composition for soft materials of the present invention is more preferably 0.5% by mass at the minimum and 20% by mass at the maximum.

The composition for soft materials of the present invention contains a radical polymerizable monomer.

Examples of the radical polymerizable monomer include styrene monomers, vinyl compounds, (meth)acrylic acid, and (meth)acrylic esters. Particularly, the composition preferably contains a one-functional (monofunctional) radical polymerizable monomer having one radical polymerizable group in a molecule because a stress relaxation property is sufficiently imparted to an obtainable soft material. For example, if a polyfunctional radical polymerizable monomer such as a polyfunctional (meth)acrylate is used, a large number of crosslinking points are present, and the effect of imparting a stress dispersibility to an obtainable soft material may not be sufficiently exerted.

Examples of the styrene monomer include styrene, α-methylstyrene, 2,4-dimethylstyrene, α-ethylstyrene, α-butylstyrene, α-hexylstyrene, 4-chlorostyrene, 3-chlorostyrene, 4-bromostyrene, 4-nitrostyrene, 4-methoxystyrene, and vinyl toluene.

Examples of the vinyl compound include cyclohexene, 4-vinylcyclohexene, and 5-vinylbicyclo[2,2,1]hept-2-ene.

Examples of one-functional (monofunctional) (meth) acrylic esters include methyl(meth)acrylate, ethyl(meth) acrylate, n-propyl(meth)acrylate, isopropyl(meth)acrylate, n-butyl(meth)acrylate, sec-butyl(meth)acrylate, tert-butyl (meth)acrylate, 2-methylbutyl(meth)acrylate, 2-ethylbutyl (meth)acrylate, 3-methylbutyl(meth)acrylate, 1,3-dimethylbutyl(meth)acrylate, pentyl(meth)acrylate, hexyl(meth) acrylate, 2-ethylhexyl(meth)acrylate, heptyl(meth)acrylate, octyl(meth)acrylate, 2-methoxyethyl acrylate, 2-ethoxyethyl acrylate, 3-ethoxypropyl acrylate, 2-ethoxybutyl acrylate, 3-ethoxybutyl acrylate, dimethyl aminoethyl(meth)acrylate, hydroxyethyl(meth)acrylate, hydroxypropyl(meth)acrylate, hydroxybutyl(meth)acrylate, ethyl-α-(hydroxymethyl)acrylate, methyl-α-(hydroxymethyl)acrylate, phenyl(meth)acrylate, benzyl(meth)acrylate, phenylethyl(meth)acrylate, N,N-dimethyl(meth)acrylamide, and N,N-diethyl(meth)acrylamide.

Examples of two- or higher functional (bi- or higher functional) (meth)acrylic esters include ethylene glycol di(meth)acrylate, diethylene glycol di(meth)acrylate, triethylene glycol di(meth)acrylate, tetraethylene glycol di(meth) acrylate, propylene glycol di(meth)acrylate, dipropylene glycol di(meth)acrylate, tripropylene glycol di(meth)acrylate, 1,3-butanediol di(meth)acrylate, 1,4-butanediol di(meth)acrylate, 1,5-pentanediol di(meth)acrylate, 1,6-hexanediol di(meth)acrylate, neopentyl glycol di(meth)acrylate, bis(4-methacryloyl thiophenyl)sulfide, bis(2-methacryloyl thioethyl)sulfide, N,N'-methylenebisacrylamide, trimethyrolpropane tri(meth)acrylate, pentaerythritol tri(meth)acrylate, pentaerythritol tetra(meth)acrylate, dipentaerythritol penta(meth)acrylate, and dipentaerythritol hexa(meth)acrylate.

Since sufficient flexibility, elongation, and strength can be imparted to an obtainable soft material, preferred are (meth) acrylic acid and (meth)acrylic esters, and more preferred are (meth)acrylic acid and one-functional (monofunctional) (meth)acrylic esters. Still more preferred are (meth)acrylic acid, methyl(meth)acrylate, ethyl(meth)acrylate, n-propyl (meth)acrylate, isopropyl(meth)acrylate, n-butyl(meth)acrylate, sec-butyl(meth)acrylate, tert-butyl(meth)acrylate, 2-methylbutyl(meth)acrylate, 2-ethylbutyl(meth)acrylate, 3-methylbutyl(meth)acrylate, 1,3-dimethylbutyl(meth)acrylate, pentyl(meth)acrylate, hexyl(meth)acrylate, 2-ethylhexyl(meth)acrylate, heptyl(meth)acrylate, octyl(meth)acrylate, 2-methoxyethyl acrylate, 2-ethoxyethyl acrylate, 3-ethoxypropyl acrylate, 2-ethoxybutyl acrylate, 3-ethoxybutyl acrylate, dimethylaminoethyl(meth)acrylate, hydroxyethyl(meth)acrylate, hydroxypropyl(meth)acrylate, hydroxy butyl(meth)acrylate, ethyl-α-(hydroxymethyl)acrylate, and methyl-α-(hydroxymethyl)acrylate. Particularly preferred are methyl(meth)acrylate, ethyl(meth)acrylate, n-butyl (meth)acrylate, 2-ethylhexyl(meth)acrylate, 2-methoxyethyl acrylate, hydroxyethyl(meth)acrylate, and hydroxy butyl (meth)acrylate.

Each of these radical polymerizable monomers may be used alone, or two or more of these may be used in combination.

The term "n functional (n is a natural number)" as used herein refers to possession of n radical polymerizable groups in a molecule.

In the case of using two or more kinds of radical polymerizable monomers, the ratio of the radical polymerizable monomers can be appropriately determined in accordance with the desired properties to be imparted to a soft material.

The amount of the radical polymerizable monomer is preferably 35% by mass at the minimum and 99.8% by mass at the maximum based on the amount of the whole composition for soft materials of the present invention. When the amount of the radical polymerizable monomer is within the above range, an obtainable soft material is excellent in the flexibility, elongation at break, and strength. The amount of the radical polymerizable monomer based on the amount of the whole composition for soft materials of the present invention is more preferably 40% by mass at the minimum and 99.5% by mass at the maximum.

The ratio (by mass) between the amount of the polyrotaxane and the amount of the radical polymerizable monomer in the composition for soft materials of the present invention is preferably (polyrotaxane):(radical polymerizable monomer)=0.5:99.5 to 40:60. When the ratio of the polyrotaxane is 0.5 or more, an obtainable soft material is excellent in the strength. When the ratio of the polyrotaxane is less than 40, an obtainable soft material is excellent in the flexibility and elongation at break. The ratio of the polyrotaxane is more preferably 30 at the maximum and still more preferably 20 at the maximum.

The composition for soft materials of the present invention preferably contains a radical polymerization initiator.

Examples of the radical polymerization initiator include thermal radical polymerization initiators generating radicals by heat and photo-radical polymerization initiators generating radicals by light. In production of a soft material thick film using the composition for soft materials of the present invention, a thermal radical polymerization initiator is preferably used because photopolymerization may cause a curing failure or curing retardation in a deep part.

Examples of the thermal radical polymerization initiator include: azo compounds such as 2,2'-azobisisobutyronitrile, 2,2'-azobis(2-methylbutyronitrile), 2,2'-azobisisovaleronitrile, 2,2'-azobis(2,4-dimethyl valeronitrile), and 1,1'-azobis (cyclohexane-1-carbonitrile); and peroxide compounds such as methyl ethyl ketone peroxide, methyl isobutyl ketone peroxide, cyclohexanone peroxide, benzoyl peroxide, lauroyl peroxide, and 2,4-dichloro benzoyl peroxide.

Examples of the photo-radical polymerization initiator include p-isopropyl-α-hydroxyisobutylphenone, α-hydroxyisobutylphenone, 2,2-dimethoxy-2-phenyl acetophenone, 4'-methylthio-2,2-dimethyl-2-morpholinoacetophenone, benzoin isobutyl ether, chlorothioxanthone, 2,4,6-trimethylbenzoyl diphenylphosphine oxide, and bis(2,4,6-trimethylbenzoyl)phenylphosphine oxide.

Each of these radical polymerization initiators may be used alone, or two or more of these may be used in combination.

These radical polymerization initiators may be appropriately selected and used in accordance with the kind and ratio of the radical polymerizable monomer to be used as long as the solubility thereof in the radical polymerizable monomer is within an allowable range.

The amount of the radical polymerization initiator is appropriately adjusted in accordance with the activity of the radical polymerizable monomer and the radical polymerization initiator. Commonly, the amount is preferably 0.001 mol at the minimum and 1 mol at the maximum based on 100 mol of the total of the radical polymerizable groups of the cyclic molecules in the polyrotaxane and the radical polymerizable groups of the radical polymerizable monomer. When the amount of the radical polymerization initiator is 0.001 mol or more, radical polymerization can proceed sufficiently. When the amount of the radical polymerization initiator is 1 mol or less, an obtainable soft material is excellent in the strength. The amount of the radical polymerization initiator is more preferably 0.01 mol at the minimum and 0.8 mol at the maximum, and still more preferably 0.05 mol at the minimum and 0.5 mol at the maximum.

The composition for soft materials of the present invention may contain a plasticizer with an aim of adjusting the flexibility or modulus of elasticity of an obtainable soft material as desired.

Examples of the plasticizer include phthalic acid derivatives (e.g., dimethyl phthalate, diethyl phthalate, di-n-butyl phthalate, di-(2-ethylhexyl) phthalate, diheptyl phthalate, diisodecyl phthalate, di-n-octyl phthalate, diisononyl phthalate, ditridecyl phthalate, octyldecyl phthalate, butyl benzyl phthalate, dicyclohexyl phthalate), isophthalic acid derivatives (e.g., dimethyl isophthalate), tetrahydrophthalic acid derivatives (e.g., di-(2-ethylhexyl)tetrahydrophthalate), adipic acid derivatives (e.g., dimethyl adipate, dibutyl adipate, di-n-hexyl adipate, di-(2-ethylhexyl) adipate, isononyl adipate, diisodecyl adipate, dibutyldiglycol adipate), azelaic acid derivatives (e.g., di-2-ethylhexyl azelate), sebacic acid derivatives (e.g., dibutyl sebacate), dodecanedioic acid derivatives, maleic acid derivatives (e.g., dibutyl maleate, di-2-ethylhexyl maleate), fumaric acid derivatives (e.g., dibutyl fumarate), trimellitic acid derivatives (e.g., tris-2-ethylhexyl trimellitate), pyromellitic acid derivatives, citric acid derivatives (e.g., acetyl tributyl citrate), itaconic acid derivatives, oleic acid derivatives, ricinoleic acid derivatives, stearic acid derivatives, other fatty acid derivatives, sulfonic acid derivatives, phosphoric acid derivatives, glutaric acid derivatives, polyester plasticizers that are polymers of dibasic acids (e.g., adipic acid, azelaic acid, phthalic acid) and glycols and monovalent alcohols, glycol derivatives, glycerin derivatives, paraffin derivatives (e.g., chlorinated paraffin), epoxy derivative polyester polymerization type plasticizers, polyether polymerization type plasticizers, and carbonate derivatives (e.g., ethylene carbonate, propylene carbonate). In particular, preferred are those having favorable compatibility with the polyrotaxane, the radical polymerizable monomer, and polymers thereof. More preferred are low volatile plasticizers having low heating loss, including adipic acid derivatives, phthalic acid derivatives, glutaric acid derivatives, trimellitic acid derivatives, pyromellitic acid derivatives, citric acid derivatives, polyester plasticizers, glycerin derivatives, epoxy derivative polyester polymerization type plasticizers, polyether polymerization type plasticizers.

Each of these plasticizers may be used alone, or two or more of these may be used in combination.

The amount of the plasticizer is preferably less than 100 parts by mass, and more preferably less than 50 parts by mass based on 100 parts by mass of the radical polymerizable monomer.

The composition for soft materials of the present invention may contain a polymerization inhibitor with an aim of ensuring the stability.

Examples of the polymerization inhibitor include 4-methoxyphenol, 2,6-di-t-butyl-4-methylphenol (BHT), 6-t-butyl-2,4-dimethylphenol, 4,4'-thiobis-(6-t-butyl-3-methylphenol), and 2,2'-methylenebis-(4-methyl-6-t-butylphenol).

Each of these polymerization inhibitors may be used alone, or two or more of these may be used in combination.

The amount of the polymerization inhibitor is preferably 0.2 parts by mass at the maximum based on 100 parts by mass of the total of the polyrotaxane and the radical polymerizable monomer. When the amount of the polymerization inhibitor is 0.2 parts by mass or less, radical polymerization reaction can proceed well without being inhibited. The amount of the polymerization inhibitor is more preferably 0.1 parts by mass at the maximum.

Preferably, the composition for soft materials of the present invention does not contain a solvent as the composition containing a solvent may require a drying step in production of a soft material, or have a difficulty in forming a thick film and a difficulty in molding thereof. The composition, however, may contain a solvent with an aim of improving the workability.

Examples of the solvent include alcohols (e.g., methanol, ethanol, isopropanol, butanol, tetrafluoropropanol), halogenated hydrocarbons (e.g., chloroform, dichloromethane), glycols (e.g., ethylene glycol, 1,2-propanediol, 1,3-propanediol, 1,4-butanediol, diethylene glycol), ketones (e.g., acetone, methyl ethyl ketone, methyl isobutyl ketone, cyclopentanone, cyclohexanone, 2-heptanone, 3-heptanone, 3-octanone), esters (e.g., ethyl acetate, ethyl 2-hydroxypropionate, n-butyl 3-methyl-3-methoxypropionate, 3-methoxy ethyl propionate, 3-ethoxy methyl propionate, 3-ethoxy ethyl propionate, n-butyl acetate, isobutyl acetate, n-amyl formate, isoamyl acetate, n-butyl propionate, ethyl butyrate, isopropyl butyrate, n-butyl butyrate, ethyl pyruvate, γ-butyrolactone, ethyl lactate), ethers (e.g., diethyl ether, cyclopentyl methyl ether, tetrahydrofuran), aromatics (e.g., toluene, xylene, monochloro benzene, dichloro benzene), hydrocarbons (e.g., n-pentane, cyclopentane, n-hexane, cyclohexane, n-heptane, cycloheptane), lactams (e.g., 2-pyrrolidone, N-methyl-2-pyrrolidone, ε-caprolactam), glycol ethers (e.g., ethylene glycol monomethyl ether acetate, diethylene glycol monomethyl ether, diethylene glycol dimethyl ether, diethylene glycol monoethyl ether, diethylene glycol mono-n-butyl ether acetate, propylene glycol monomethyl ether acetate, propylene glycol monoethyl ether acetate), acetonitrile, sulfolane, dimethyl sulfoxide, and N,N-dimethylformamide.

The composition for soft materials of the present invention may appropriately contain a curing agent, a curing catalyst, a crosslinking agent, a coupling agent, a leveling agent, a lubricant, an antistatic agent, an antioxidant, a light stabilizer, a heat stabilizer, an anti-coloring agent, a metal deactivator, a flame retardant, a filler, a colorant, a photocatalyst material, a rust inhibitor, a water repellent agent, a conductive material, an anti-blocking agent, a softener, a mold release agent, a defoamer, a fluorescent brightener, a bluing agent, and a chain transfer agent as long as they do not impair the aim of the present invention.

In an exemplary method of producing the composition for soft materials of the present invention, a container in which contents can be stirred is charged with the polyrotaxane and the radical polymerizable monomer and, if necessary, additives such as a plasticizer, and the mixture is stirred for dissolution.

In the composition for soft materials of the present invention, the polyrotaxane and the radical polymerizable monomer may be partly polymerized. In other words, in production of a soft material using the composition for soft materials of the present invention, if the viscosity of the composition for soft materials is to be increased for the purpose of enhancing the workability or the like, the polyrotaxane and the radical polymerizable monomer may be polymerized until the desired viscosity is achieved (prepolymerization). When prepolymerization is performed, the polymerization reaction is preferably stopped by addition of a polymerization inhibitor after the desired viscosity is achieved. When the composition for soft materials used for production of a soft material is a composition preliminary subjected to prepolymerization that is stopped by addition of a polymerization inhibitor, a radical polymerization initiator is preferably added. As the radical polymerization initiator used in such a case, preferred among those described above is a peroxide compound.

Thus obtained composition for soft materials of the present invention is polymerized to produce a soft material. The soft material produced using the composition for soft materials of the present invention is also encompassed by the present invention.

The soft material of the present invention can be produced as follows. The obtained composition for soft materials of the present invention is, after deaerated or defoamed, filled into a molding frame in a predetermined shape. The composition is thermally polymerized by heating or photopolmyerized by exposure to light while being kept in a state of not contacting air (oxygen), so that the soft material is produced.

The method of deaerating or defoaming the composition for soft materials of the present invention is not particularly limited, as long as dissolved oxygen in the composition for soft materials which may inhibit the polymerization reaction can be sufficiently removed. For example, a conventionally known method can be employed, such as bubbling with inert gas (e.g, nitrogen, argon), vacuum/decompression deaeration, ultrasonic deaeration, hollow fiber membrane deaeration, and a combination of these.

In a case where the soft material of the present invention is produced by thermal polymerization, a method is employable in which the composition for soft materials of the present invention after deaerated or defoamed is filled in a molding frame in a predetermined shape and then heated so that the polymerization reaction proceeds.

The polymerization temperature and polymerization time of the thermal polymerization reaction are depending on the kind and ratio of the radical polymerizable monomer to be used and the kind and the amount of a thermal radical polymerization initiator, if it is used. Commonly, the polymerization temperature is preferably 0 to 180° C. and more preferably 20 to 150° C. The polymerization time is preferably 0.2 to 50 hours and more preferably 1 to 24 hours.

In a case where the soft material of the present invention is produced by photopolymerization, the composition for soft materials of the present invention, containing the photoradical polymerization initiator, is deaerated or defoamed, filled into a molding frame in a predetermined shape, and then exposed to light so that the polymerization reaction proceeds.

Examples of the light source used for the photopolymerization reaction include a low pressure mercury lamp, a high pressure mercury lamp, an ultra-high pressure mercury lamp, a hydrogen lamp, a deuterium lamp, a halogen lamp, an excimer laser, a nitrogen laser, and a helium-cadmium laser.

The accumulated amount of irradiated light depends on the kind and ratio of the radical polymerizable monomer to be used, the kind and amount of the photoradical polymerization initiator, and the shape of the molded body. Commonly, the accumulated amount of irradiated light is preferably 0.01 to 500 $J/cm^2$ and more preferably 0.1 to 100 $J/cm^2$.

After polymerization, the polymerized product is taken out from the molding frame. The soft material of the present invention is thus prepared.

The soft material of the present invention is made of radical polymers that are formed with an aid of polyrotaxane serving as a crosslinking agent, and has "high breaking strength", "high elongation at break", and a "high stress relaxation property". These properties are hardly imparted to a radical polymer produced using a conventional crosslinking agent that is used for crosslinking of a radical polymerizable monomer. Because of such properties, the soft material of the present invention is favorably used for shoe sole materials, cushioning materials or shock absorption materials of helmets and protectors, buffer materials, vibration-proof materials, soundproof materials, fiber materials, optical adhesives, relaxation layer materials, bedding filler, fomentation, wound dressing materials, protective mats, and coating materials.

Advantageous Effects of Invention

The present invention can provide a composition for soft materials, which enables production of a soft material excellent in transparency, a stress relaxation property, and strength and having an elongation property that is not so much lowered even at high temperatures. The present invention can further provide a soft material produced using the composition for soft materials.

BRIEF DESCRIPTION OF DRAWINGS

FIG. 1 are each a schematic diagram illustrating an exemplary structure of a soft material produced using the composition for soft materials of the present invention.

DESCRIPTION OF EMBODIMENTS

The present invention is specifically described in the following with reference to, but not limited to, examples. It is to be noted that polyrotaxane used in production examples were prepared in accordance with the method disclosed in Patent Literature 1.

Production Example 1

Polyrotaxane (inclusion rate of cyclic molecule: 25%) prepared had polyethylene glycol (mass average molecular weight: 35000) as a linear molecule, α-cyclodextrin (substitution degree of hydroxypropyl group: 49%, polymerization degree of polycaprolactone: 4.1) that was preliminary subjected to introduction of a hydroxypropyl group followed by graft polymerization of ε-caprolactone, as a cyclic molecule, and an adamantaneamine group as a capping group. The polyrotaxane was dissolved in xylene to prepare 300 g of a 35% by mass solution. To the solution, 60 mg of 4-methoxyphenol was added as a polymerization inhibitor. The mixture was stirred at room temperature until 4-methoxyphenol was completely dissolved therein. To the solution, 19.1 g of 2-methacryloyloxyethyl isocyanate was added. After stirring for 30 minutes, the mixture was warmed to 60° C. and allowed to react for 4 hours. The obtained reaction solution was cooled to room temperature and added to a large amount of methanol. The mixture was stirred and a resulting precipitate was taken out by centrifugation. The obtained precipitate was dissolved in a large amount of acetone and then added to a large amount of methanol. The mixture was stirred for reprecipitation, and the precipitate was taken out by centrifugation. The obtained precipitate was dried to give 117.9 g of polyrotaxane (PR-1) having a methacryloyloxy ethyl carbamoyl group as a (meth)acryloyl group that is a radical polymerizable group in a cyclic molecule and having two or more radical polymerizable groups. The introduction rate of the radical polymerizable groups in the obtained polyrotaxane (PR-1) was calculated by the calculation method described above. As a result, the introduction rate of the methacryloyloxy ethyl carbamoyl group (radical polymerizable group) in the polyrotaxane (PR-1) was 79%.

Production Example 2

Polyrotaxane (PR-2) (106.2 g) having a methacryloyloxy ethyl carbamoyl group as a (meth)acryloyl group that is a radical polymerizable group in a cyclic molecule and having two or more radical polymerizable groups was obtained in the same manner as in Production example 1, except that the amount of 2-methacryloyloxyethyl isocyanate was changed to 7.2 g. The introduction rate of the radical polymerizable groups in the obtained polyrotaxane (PR-2) was calculated in the same manner as in Production example 1. As a result, the introduction rate of the methacryloyloxy ethyl carbamoyl group (radical polymerizable group) in the polyrotaxane (PR-2) was 30%.

Production Example 3

Polyrotaxane (PR-3) (101.8 g) having a methacryloyloxy ethyl carbamoyl group as a (meth)acryloyl group that is a radical polymerizable group in a cyclic molecule and having two or more radical polymerizable groups was obtained in the same manner as in Production example 1, except that the amount of 2-methacryloyloxyethyl isocyanate was changed to 2.4 g. The introduction rate of the radical polymerizable groups in the obtained polyrotaxane (PR-3) was calculated in the same manner as in Production example 1. As a result, the introduction rate of the methacryloyloxy ethyl carbamoyl group (radical polymerizable group) in the polyrotaxane (PR-3) was 11%.

Production Example 4

Polyrotaxane (inclusion rate of cyclic molecule: 25%) prepared had polyethylene glycol (mass average molecular weight: 35000) as a linear molecule, α-cyclodextrin (substitution degree of hydroxypropyl group: 49%, polymerization degree of polycaprolactone: 4.1) that was preliminary subjected to introduction of a hydroxypropyl group followed by graft polymerization of ε-caprolactone, as a cyclic molecule, and an adamantaneamine group as a capping group. The polyrotaxane was dissolved in xylene to prepare 300 g of a 35% by mass solution. The solution was added to a large amount of methanol. The mixture was stirred and a precipitate was taken out by centrifugation. The obtained precipitate was dissolved in a large amount of acetone, and the resulting solution was added to a large amount of methanol. The mixture was stirred for reprecipitation, and the precipitate was taken out by centrifugation. The obtained precipitate was dried to give 99.8 g of polyrotaxane (PR-4) not having a radical polymerizable group.

Examples 1 to 16, Comparative Examples 1 to 18

A 30-mL sample bottle equipped with a stirrer was charged with materials in accordance with the formulation shown in Tables 1 and 2. The mixture was stirred at 25° C. for one hour to give a homogeneous solution. To the obtained solution, 2,2'-azobisisobutylonitrile was added as a polymerization initiator. The mixture was stirred at 25° C. for 30 minutes and then subjected to ultrasonic treatment for 3 minutes to give a composition for soft materials. The obtained composition for soft materials was sufficiently deaerated and filled into a glass mold having a diameter of 80 mm and a thickness of 2 mm. The composition was heated at 60° C. for 10 hours to complete the polymerization reaction, and released from the mold. A soft material was thus obtained.

In Tables 1 and 2, "MMA" means methyl methacrylate (produced by KANTO CHEMICAL CO., INC.), "2-EHA" means 2-ethyl hexyl acrylate (produced by Tokyo Chemical Industry Co., Ltd.), "BA" means n-butyl acrylate (produced by Tokyo Chemical Industry Co., Ltd.), "EA" means ethyl acrylate (produced by Tokyo Chemical Industry Co., Ltd.), "MEA" means 2-methoxyethyl acrylate (produced by Tokyo Chemical Industry Co., Ltd.), "TEGDMA" means triethylene glycol dimethacrylate (produced by Tokyo Chemical Industry Co., Ltd.), "TMPTA" means trimethylolpropane triacrylate (produced by SHIN-NAKAMURA CHEMICAL CO., LTD.), "MBAA" means N,N'-methylenebisacrylamide (produced by Tokyo Chemical Industry Co., Ltd.), "ATBC" means acetyl tributyl citrate (produced by Tokyo Chemical Industry Co., Ltd.), and "AIBN" means 2,2'-azobisisobutylonitrile (produced by Wako Pure Chemical Industries, Ltd).

TABLE 1

| | Polyrotaxane having two or more radical polymerizable groups (g) | Radical polymerizable monomer (g) | | | | | Plasticizer (g) | Polymerization initiator (mg) |
|---|---|---|---|---|---|---|---|---|
| | | MMA | 2-EHA | BA | EA | MEA | ATBC | AIBN |
| Example 1 | PR-1  0.0892 | 4.00 | 6.00 | — | — | — | 1.784 | 22.4 |
| Example 2 | PR-1  0.2050 | 4.00 | 6.01 | — | — | — | 1.784 | 22.5 |
| Example 3 | PR-1  0.4171 | 4.01 | 6.00 | — | — | — | 1.784 | 22.3 |
| Example 4 | PR-1  0.6183 | 4.00 | 6.00 | — | — | — | 1.784 | 22.6 |
| Example 5 | PR-2  0.0892 | 4.00 | 6.00 | — | — | — | 1.784 | 22.4 |
| Example 6 | PR-2  0.6181 | 4.00 | 6.00 | — | — | — | 1.784 | 22.2 |
| Example 7 | PR-3  0.6180 | 4.00 | 6.00 | — | — | — | 1.784 | 22.4 |
| Example 8 | PR-1  0.0891 | 4.00 | 6.00 | — | — | — | — | 22.4 |
| Example 9 | PR-1  0.2053 | 4.00 | 6.01 | — | — | — | — | 22.3 |
| Example 10 | PR-2  0.0892 | 4.00 | 6.00 | — | — | — | — | 22.4 |
| Example 11 | PR-3  0.6182 | 4.00 | 6.02 | — | — | — | — | 22.5 |
| Example 12 | PR-1  0.0891 | 2.00 | 8.00 | — | — | — | 1.784 | 19.8 |
| Example 13 | PR-1  0.2051 | 2.01 | 8.00 | — | — | — | 1.784 | 19.6 |
| Example 14 | PR-1  0.0892 | 4.00 | — | 6.00 | — | — | 1.784 | 26.5 |
| Example 15 | PR-1  0.2051 | 4.01 | — | 6.00 | — | — | 1.784 | 26.5 |
| Example 16 | PR-1  0.0892 | — | — | — | 4.02 | 6.00 | 1.784 | 26.6 |

TABLE 2

| | Conventional crosslinking agent (g) | Radical polymerizable monomer (g) | | | | | Plasticizer (g) | Polymerization initiator (mg) |
|---|---|---|---|---|---|---|---|---|
| | | MMA | 2-EHA | BA | EA | MEA | ATBC | AIBN |
| Comparative Example 1 | TEGDMA  0.0402 | 4.00 | 6.00 | — | — | — | 1.784 | 22.5 |
| Comparative Example 2 | TEGDMA  0.0893 | 4.00 | 6.00 | — | — | — | 1.784 | 22.4 |
| Comparative Example 3 | TEGDMA  0.2053 | 4.00 | 6.01 | — | — | — | 1.784 | 22.8 |
| Comparative Example 4 | TMPTA  0.0163 | 4.00 | 6.00 | — | — | — | 1.784 | 22.3 |
| Comparative Example 5 | TMPTA  0.0276 | 4.01 | 6.00 | — | — | — | 1.784 | 22.4 |
| Comparative Example 6 | TMPTA  0.0616 | 4.00 | 6.00 | — | — | — | 1.784 | 22.5 |
| Comparative Example 7 | TMPTA  0.1414 | 4.00 | 6.00 | — | — | — | 1.784 | 22.6 |
| Comparative Example 8 | MBAA  0.0321 | 4.01 | 6.00 | — | — | — | 1.784 | 22.5 |
| Comparative Example 9 | PR-4  0.0893 | 4.00 | 6.00 | — | — | — | 1.784 | 22.4 |
| Comparative Example 10 | TEGDMA  0.0403 | 4.00 | 6.00 | — | — | — | — | 22.4 |
| Comparative Example 11 | TEGDMA  0.0892 | 4.00 | 6.00 | — | — | — | — | 22.6 |
| Comparative Example 12 | TEGDMA  0.2050 | 4.01 | 6.01 | — | — | — | — | 22.8 |
| Comparative Example 13 | TEGDMA  0.0400 | 2.00 | 8.00 | — | — | — | 1.784 | 19.5 |
| Comparative Example 14 | TEGDMA  0.0892 | 2.02 | 8.01 | — | — | — | 1.784 | 19.7 |
| Comparative Example 15 | TEGDMA  0.2054 | 2.00 | 8.00 | — | — | — | 1.784 | 19.9 |
| Comparative Example 16 | TEGDMA  0.0402 | 4.00 | — | 6.00 | — | — | 1.784 | 26.6 |
| Comparative Example 17 | TEGDMA  0.0892 | 4.00 | — | 6.02 | — | — | 1.784 | 27.0 |
| Comparative Example 18 | TEGDMA  0.0402 | — | — | — | 4.00 | 6.02 | 1.784 | 26.6 |

Comparative Example 19

A urethane composition for soft materials was produced in the same manner as in Example 1 of Patent Literature 1. The production method is specifically described in the following.

(Preparation of Polyrotaxane (A-1) not having a Radical Polymerizable Group)

A compound (hereafter, also referred to as "HAPR35") containing polyrotaxane (inclusion rate of cyclic molecule: 25%) was prepared in the same manner as in the method disclosed in WO 05/080469. The polyrotaxane had polyethylene glycol (mass average molecular weight: 35000) as a linear molecule and α-cyclodextrin as a cyclic molecule, and an adamantaneamine group as a capping group, and part of hydroxy groups of the α-cyclodextrin was further hydroxypropylated (α-cyclodextrin inclusion rate: 25%, Substitution degree of hydroxypropyl group: 49%).

An amount of 20 g of HAPR35 was charged into a three-neck flask and 90 g of ε-caprolactone was introduced thereinto under a gentle stream of nitrogen. The contents were homogeneously stirred with a mechanical stirrer at 100° C. for 60 minutes, and 6 g of tin 2-ethylhexanoate (50% by mass solution) preliminary diluted in toluene was added thereto. The resulting product was reacted for 5 hours, and the solvent was removed therefrom. Thus, polyrotaxane (A-1) not having a radical polymerizable group was prepared.

(Preparation of Crosslinking Agent B-1)

An amount of 28.0 g of 1,3-bis(isocyanatomethyl)cyclohexane (produced by Mitsui Chemicals, Inc., "Takenate 600") was charged into a 200-mL reaction vessel and heated to 80° C. with stirring under a stream of nitrogen. An amount of 49.8 g of polycarbonate diol (produced by Asahi Kasei Chemicals Corporation, "DURANOL T-5650J") was warmed to 70° C. and then slowly added dropwise to the reaction vessel over 4 hours. The mixture was further stirred for 3 hours to give polycarbonate having isocyanate groups at both ends.

An amount of 77.78 g of the obtained polycarbonate having isocyanate groups at both ends was charged into a 200-mL reaction vessel, and then heated to 100° C. with stirring under a stream of nitrogen. An amount of 20.38 g of ε-caprolactam was added thereto, and the mixture was stirred for 6 hours to give a crosslinking agent B-1 in which isocyanate groups at both ends of polycarbonate were protected by ε-caprolactam. The measurement with an FT-IR clarified that the peak derived from an isocyanate group at around 2250 $cm^{-1}$ disappeared, thereby confirming the protection of the isocyanate groups.

(Preparation of Composition for Soft Materials)

A reaction vessel was charged with 32.2 g of polyrotaxane (A-1) not having a radical polymerizable group, 46.0 g of the crosslinking agent B-1, 29.4 g of polycarbonate diol (produced by Asahi Kasei Chemicals Corporation, "DURANOL T-5650)"), 11.0 mg of dibutyl tin dilaurate as a deprotection catalyst, and 2.11 g of 2,4-bis(dodecylthiomethyl)-6-methyl phenol (produced by BASF SE, "Irganox1726") as a stabilizer. The contents were heated to 80° C. and stirred to give a homogeneous solution. The solution was defoamed under reduced pressure to give a urethane composition for soft materials.

(Preparation of Soft Material)

The obtained composition for soft materials were sufficiently deaerated and filled into a glass mold having a diameter of 80 mm and a thickness of 2 mm. The composition was heated at 150° C. for 5 hours to complete the polymerization reaction, and released from the mold. A soft material was thus obtained.

Comparative Example 20

A urethane composition for soft materials was prepared in the same manner as in Example 2 of Patent Literature 1. The production method is specifically described in the following.
(Preparation of Crosslinking Agent B-2)

An amount of 30.0 g of 1,3-bis(isocyanatomethyl)cyclohexane (produced by Mitsui Chemicals, Inc., "Takenate 600") was charged into a 200-mL reaction vessel and heated to 80° C. with stirring under a stream of nitrogen.

An amount of 33.2 g of polycarbonate diol (produced by Asahi Kasei Chemicals Corporation, "DURANOL T-5650E") was warmed to 70° C. and then slowly added dropwise to the reaction vessel over 2 hours. The mixture was further stirred for 3 hours to give polycarbonate having isocyanate groups at both ends.

An amount of 63.2 g of the obtained polycarbonate having isocyanate groups at both ends was charged into a 200-mL reaction vessel, and then heated to 100° C. with stirring under a stream of nitrogen. An amount of 19.9 g of ε-caprolactam was added thereto, and the mixture was stirred for 6 hours to give a crosslinking agent B-2 in which isocyanate groups at both ends of polycarbonate were protected by ε-caprolactam. The measurement with a FT-IR clarified that the peak derived from an isocyanate group at around 2250 $cm^{-1}$ disappeared, thereby confirming the protection of the isocyanate groups.

(Preparation of Composition for Soft Materials)

A reaction vessel was charged with 30.0 g of polyrotaxane (A-1) not having a radical polymerizable group prepared in the same manner as in Comparative Example 19, 83.1 g of the crosslinking agent B-2, 66.9 g of polycarbonate diol (produced by Asahi Kasei Chemicals Corporation, "DURANOLT-5650J"), 52 mg of dibutyl tin dilaurate as a deprotection catalyst, and 1.80 g of 2,4-bis(dodecylthiomethyl)-6-methylphenol (produced by BASF SE, "Irganox1726"). The contents were heated to 80° C. and stirred to give a homogeneous solution. The solution was defoamed under reduced pressure to give a urethane composition for soft materials.

(Preparation of Soft Material)

The obtained composition for soft materials were sufficiently deaerated and filled into a glass mold having a diameter of 80 mm and a thickness of 2 mm. The composition was heated at 150° C. for 5 hours to complete the polymerization reaction, and released from the mold. A soft material was thus obtained.

<Evaluation>

The soft materials obtained in the examples and comparative examples were evaluated for the following items. Tables 3 and 4 show the results.

(Transparency)

The soft materials obtained in the examples and comparative examples were visually checked. The transparency was evaluated based on the following criteria.

"○ (good)" . . . . The soft material was transparent without coloring or cloudiness "× (poor)" . . . . Coloring or cloudiness was found in the soft material.

(Tensile Test (Breaking Strength, Elongation at Break, and Lowering Rate of Elongation at Break))

From each of the soft materials obtained in the examples and comparative examples, a dumbbell specimen (dumbbell No. 7 as defined in "JIS K 6251") was punched. Using the specimen, the tensile test was carried out under the following conditions, thereby obtaining the breaking strength and elongation at break.

Device: AUTO GRAPH AG-1000D type (produced by Shimadzu Corporation)
Load cell: 50N
Measurement temperature: 25° C., 80° C.
Intermarker distance: 20 mm
Tensile speed: 10 mm/min The lowering rate of elongation at break was calculated using the following formula wherein the elongation at break at 25° C. was represented by B1 and the elongation at break at 80° C. was represented by B2.

Lowering rate of elongation at break (%)={(B1−B2)/B1}×100

(Tensile Stress Relaxation Test)

From each of the soft materials obtained in the examples and comparative examples, a dumbbell specimen (dumbbell No. 7 as defined in "JIS K 6251") was punched. The tensile stress relaxation test was carried out using the same device as that used in the tensile test. Each specimen was distorted in an amount as shown in Tables 3 and 4 and held for 40 minutes while the distortion was kept. The stress relaxation rate was calculated using the following formula in which the maximum stress value during 40 minutes was represented by B3 and the stress value after a lapse of 40 minutes was represented by B4.

Stress relaxation rate (%)={(B3−B4)/B3}×100.

TABLE 3

| | | Tensile test (25° C.) | | Tensile test (80° C.) | | Lowering | Tensile stress relaxation test | | |
| --- | --- | --- | --- | --- | --- | --- | --- | --- | --- |
| | Transparency | Breaking strength (Mpa) | Elongation at break (%) | Breaking strength (Mpa) | Elongation at break (%) | rate of elongation at break (%) | Distortion (%) | Stress relaxation rate (%) | Note |
| Example 1 | ○ | 0.45 | 705 | 0.45 | 812 | −15 | 400 | 58.9 | MMA:2-EHA = 4:6 |
| Example 2 | ○ | 0.85 | 471 | 0.48 | 437 | 7 | — | — | With plasticizer |
| Example 3 | ○ | 1.30 | 382 | 0.50 | 344 | 10 | — | — | |
| Example 4 | ○ | 0.82 | 221 | 0.56 | 194 | 12 | 75 | 17.1 | |
| Example 5 | ○ | 0.85 | 890 | 0.35 | 928 | −4 | 400 | 56.1 | |
| Example 6 | ○ | 1.00 | 305 | 0.41 | 263 | 14 | 75 | 22.2 | |
| Example 7 | ○ | 1.30 | 510 | 0.29 | 434 | 15 | — | — | |
| Example 8 | ○ | 2.52 | 501 | 0.49 | 812 | −62 | 300 | 27.5 | MMA:2-EHA = 4:6 |
| Example 9 | ○ | 3.22 | 482 | 0.62 | 411 | 15 | — | — | Without plasticizer |
| Example 10 | ○ | 3.24 | 453 | 0.64 | 942 | −107 | — | — | |
| Example 11 | ○ | 3.51 | 487 | 0.35 | 448 | 8 | — | — | |
| Example 12 | ○ | 0.22 | 745 | 0.17 | 634 | 15 | 400 | 63.8 | MMA:2-EHA = 2:8 |
| Example 13 | ○ | 0.33 | 425 | 0.25 | 418 | 2 | — | — | With plasticizer |
| Example 14 | ○ | 0.58 | 905 | 0.30 | 799 | 12 | 400 | 59.7 | MMA:BA = 4:6 |
| Example 15 | ○ | 1.12 | 521 | 0.45 | 469 | 10 | — | — | With plasticizer |
| Example 16 | ○ | 0.92 | 770 | 0.31 | 641 | 17 | 400 | 53.1 | EA:MEA = 4:6 With plasticizer |

TABLE 4

| | | Tensile test (25° C.) | | Tensile test (80° C.) | | Lowering | Tensile stress relaxation test | | |
| --- | --- | --- | --- | --- | --- | --- | --- | --- | --- |
| | Transparency | Breaking strength (Mpa) | Elongation at break (%) | Breaking strength (Mpa) | Elongation at break (%) | rate of elongation at break (%) | Distortion (%) | Stress relaxation rate (%) | Note |
| Comparative Example 1 | ○ | 0.45 | 649 | 0.18 | 367 | 43 | 400 | 34 | MMA:2-EHA = 4:6 With plasticizer |
| Comparative Example 2 | ○ | 0.59 | 419 | 0.35 | 173 | 59 | — | — | |
| Comparative Example 3 | ○ | 0.47 | 205 | 0.21 | 69 | 66 | 75 | 5.41 | |
| Comparative Example 4 | ○ | 0.12 | 563 | 0.10 | 163 | 71 | — | — | |
| Comparative Example 5 | ○ | 0.45 | 569 | 0.21 | 235 | 59 | 400 | 28.5 | |
| Comparative Example 6 | ○ | 0.63 | 467 | 0.31 | 215 | 54 | — | — | |
| Comparative Example 7 | ○ | 0.5 | 184 | 0.19 | 67 | 64 | — | — | |
| Comparative Example 8 | ○ | 0.27 | 456 | 0.11 | 222 | 51 | — | — | |
| Comparative Example 9 | X: White turbidness | 0.13 | 950 | — | — | — | 400 | 75.3 | |
| Comparative Example 10 | ○ | 2.48 | 472 | 0.31 | 211 | 55 | 300 | 21.1 | MMA:2-EHA = 4:6 Without plasticizer |
| Comparative Example 11 | ○ | 2.51 | 452 | 0.35 | 184 | 59 | 300 | 18.2 | |
| Comparative Example 12 | ○ | 1.71 | 309 | 0.30 | 78 | 75 | — | — | |
| Comparative Example 13 | ○ | 0.11 | 508 | 0.07 | 218 | 57 | 400 | 44.2 | MMA:2-EHA = 2:8 With plasticizer |
| Comparative Example 14 | ○ | 0.14 | 269 | 0.08 | 90 | 62 | — | — | |
| Comparative Example 15 | ○ | 0.12 | 80 | 0.08 | 39 | 51 | — | — | |
| Comparative Example 16 | ○ | 0.58 | 800 | 0.33 | 301 | 62 | 400 | 38.9 | MMA:BA = 4:6 With plasticizer |

TABLE 4-continued

| | Transparency | Tensile test (25° C.) | | Tensile test (80° C.) | | Lowering rate of elongation at break (%) | Tensile stress relaxation test | | Note |
| | | Breaking strength (Mpa) | Elongation at break (%) | Breaking strength (Mpa) | Elongation at break (%) | | Distortion (%) | Stress relaxation rate (%) | |
|---|---|---|---|---|---|---|---|---|---|
| Comparative Example 17 | ○ | 0.61 | 478 | 0.34 | 213 | 55 | — | — | |
| Comparative Example 18 | ○ | 0.9 | 697 | 0.30 | 204 | 71 | 400 | 24.6 | EA:MEA = 4:6 With plasticizer |
| Comparative Example 19 | X: Yellow discoloration | 0.9 | 142 | — | — | — | 75 | 2.8 | Urethane elastomer |
| Comparative Example 20 | X: Yellow discoloration | 0.2 | 245 | — | — | — | 75 | 5.1 | |

In comparison of Examples 1 to 7 and Comparative Examples 1 to 8 wherein similar radical polymerizable monomers and similar plasticizers were used, the soft materials of Examples 1 to 7 in which polyrotaxane including a cyclic molecule that has a radical polymerizable group was used as a crosslinking agent had higher elongation at break and/or higher breaking strength than the soft materials of Comparative Examples 1 to 8 in which a common crosslinking agent was used. The similar results were obtained in comparison of Examples 8 to 11 and Comparative Example 10 to 12, comparison of Examples 12 to 13 and Comparative Examples 13 to 15, and comparison of Examples 14 to 15 and Comparative Examples 16 to 17.

Moreover, the soft materials of Comparative Examples 19 and 20 obtained using urethane compositions for soft materials obviously had lower elongation at break than the soft materials of Examples 16 and 12 which had the similar breaking strength respectively.

In comparison of the stress relaxation rate when the same distortion was given, the soft material of the present invention exhibited a higher stress relaxation rate than the soft material prepared using a common crosslinking agent or the soft material prepared using a urethane composition for soft materials.

In other words, the present invention enables production of the soft material having stress-elongation properties that are hardly achieved by the use of a common crosslinking agent and having both properties of high strength and a high stress relaxation property that are hardly balanced.

INDUSTRIAL APPLICABILITY

The present invention can provide a composition for soft materials, which enables production of a soft material excellent in transparency, a stress relaxation property, and strength and having an elongation property that is not so much lowered even at high temperatures. The present invention can also provide a soft material produced using the composition for soft materials.

REFERENCE SIGNS LIST

1. Polymer segment derived from radical polymerizable monomer
2. Segment derived from polyrotaxane
3. Linear molecule
4. Cyclic molecule
5. Capping group
6. Crosslinking point

The invention claimed is:
1. A polyrotaxane-containing composition comprising:
polyrotaxane; and
a radical polymerizable monomer,
wherein the polyrotaxane comprises:
  a cyclic molecule;
  a linear molecule threading through a cavity of the cyclic molecule in a skewered manner; and
  capping groups that cap both ends of the linear molecule, of
the polyrotaxane has at least two radical polymerizable groups and comprises at least one cyclic molecule having the radical polymerizable group,
the radical polymerizable group in the polyrotaxane is a (meth)acryloyl group, and
the radical polymerizable monomer comprises a one-functional radical polymerizable monomer having a single radical polymerizable group in a molecule of the one-functional radical polymerizable monomer.
2. A polyrotaxane-containing material produced from the polyrotaxane-containing composition according to claim 1.
3. The polyrotaxane-containing composition according to claim 1,
wherein an amount of the radical polymerizable monomer is in a range from 35 to 99.8% by mass relative to an amount of the composition.

* * * * *